United States Patent Office 2,952,483
Patented Sept. 13, 1960

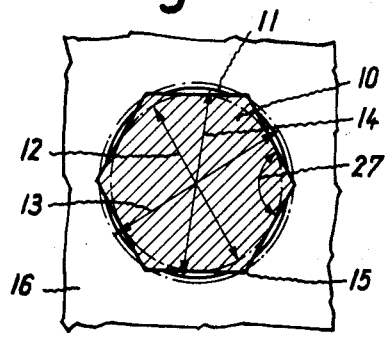
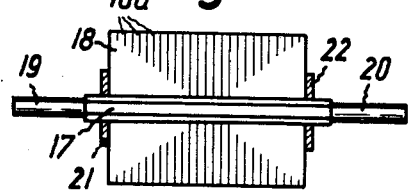
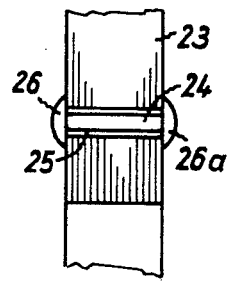
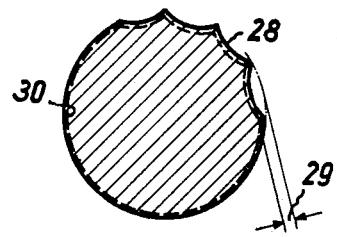

2,952,483

MEANS FOR HOLDING A STACK OF LAMINATIONS FOR USE IN ELECTRIC MACHINES AND THE LIKE APPARATUS

Hans Fleckenstein and Karl Lesch, Oldenburg, Germany, assignors to Licentia Patent-Verwaltungs-G.m.b.H., Hamburg, Germany Filed Dec. 23, 1955, Ser. No. 555,155

Claims priority, application Germany Dec. 27, 1954

4 Claims. (Cl. 287—52)

This invention relates to new means for holding together stacks of laminations to be used with electric machines and the like apparatus. It relates more particularly to means for holding together stacks of laminations in transformers, which means serves at the same time for mounting stacks of laminations or unitary bodies serving as rotors on shafts carrying such holders.

It is an object of our invention to provide means for holding together stacks of laminations for use as stators or rotors in electric machines and the like.

It is a further object of our invention to provide means for the aforesaid purpose which may serve simultaneously for fastening laminated rotors as well as single body rotors on shafts.

It is yet another object of our invention to provide an improved type of means for holding together stacks of laminations as well as fastening such stacks when used as rotors on the corresponding rotor shafts, such means imparting to the assembled stack increased rigidity and greatly simplifying the step of mounting such means for holding together a plurality of laminations forming a stack and at the same time mounting said stack as a rotor on a corresponding rotor shaft.

It is well known in the art to assemble a plurality of laminations to form a stack by means of hollow rivets, for instance of brass and the like material, clamping means of various designs, welding joints along ribs provided on the laminations, and finally by gluing such laminations together. Furthermore, in order to fasten rotors which consist, for instance of a single body or of a laminated stack on to a corresponding rotor shaft, it is customary to preseat the stacks or rotor bodies on portions of the shafts which are ribbed or grooved along a portion of the shaft corresponding in length to the length of the laminated stack or single rotor body. In the case of machines of very small dimensions and thin shafts having, for instance a diameter of 4 mm., it is preferred to fasten the shaft in the rotor body or stack by casting or gluing, since shafts of a very thin diameter tend to become distorted by ribbing.

The hitherto used rivet or clamp means are seated loosely in the holes or recesses provided in the stacks for housing them. A laminated stack thus held together shows the necessary rigidity due mainly to friction between the individual laminations. However, particularly in the case of small laminated stacks, the hitherto known fastening means do not impart to the stack a sufficient rigidity because, for instance, hollow rivets must be used which have a relatively very small diameter. In exceptional cases, pre-shaped clamps are spread apart in recesses provided in the circumferences of the laminated stack in order to improve the rigidity of the latter. However, this requires an additional working step. Welding and gluing the laminations together is not always possible and also represents a very complicated method.

According to our invention, laminated stacks serving as stators or rotors are given, in the first instance, a sufficient rigidity, and in the second instance, also a sufficient torsional strength by holding the laminated stacks together and mounting them on shafts by means of members such as rivets or shafts which possess, according to the invention, a polygonal cross section, and the longitudinal edges of which rivets or shafts are pressed into the walls of corresponding perforations or channels in the laminated stacks serving as a stator or rotor.

The aforesaid objects and advantages will become apparent from the following description in connection with the accompanying drawings in which:

Fig. 1 shows a cross sectional view of a fastening and holding means according to the invention, in a partially shown laminated stack;

Fig. 2 shows a partially sectional side view of means according to the invention serving simultaneously as clamping means and rotor shaft for a laminated stack;

Fig. 3 is a partial view of fastening means according to the invention serving as a rivet for holding together a stack of laminations; and Fig. 4 shows another embodiment of a fastening means according to the invention in cross section.

Referring now to the drawings, more in detail particularly to Fig. 1, a fastening means 10 serving either as a stator rivet or rotor shaft is placed in a hole 11 of circular diameter provided in a lamination 16 of a laminated stack. The fastening means 10 has a polygonal cross section, for instance, it is hexagonal in the case of Fig. 1. The diameter 12 of the circular inscribed in the polygon is equal to or smaller, and the diameter 13 of the circumscribed circle is always somewhat larger than the diameter 14 of the corresponding circular portion in the laminated stack. The corner portions or edges 15 of the polygonal profile of the fastening rod 17 are pressed into the inner wall of the bore having the diameter 14. The edges 15 are pressed the more readily into the bore wall the more the material of the rods 17 exceeds in hardness the material of the laminations 16 forming the stack 18.

In Fig. 2, the rotor 18 is composed of a plurality of laminations 16a, and is mounted on a shaft 17, for instance, by press-seating. Shaft 17 is of polygonal cross section and, in the embodiment shown in Fig. 2, it is shown as a hexagonal shaft. The end portions 19 and 20 of the shaft 17 are of cylindrical shape. Head shields 21 and 22 are also press-seated on to the hexagonal shaft portion 17 in order to secure the outer laminations of the stack forming the rotor body. If the rotor body does not consist of a laminated stack but is a single unitary body, for instance, of sinter iron, the end shields 21, 22 may be omitted.

In the stator stack 23 shown in Fig. 3, the hexagonal rivet 24 is not only inserted in a conventional manner but is pressed with its edges into the inner wall of the bore 25. The protruding ends of the hexagonal rivet 24 are upset to form rivet heads 26, 26a. The number of edges of the polygonal rivet or shaft depends in the first place upon the size of the rivet or shaft diameter and increases with the latter. Consequently, the angle designated at 27 in Fig. 1 becomes the more obtuse, the greater the number of edges of the polygonal rivet or shaft. Therefore, particularly in the case of shafts, it is preferable to use a substantially hypocycloidal cross section showing longitudinal grooves 28 and apex portions as illustrated in Fig. 4 rather than a body having a polygonal cross section with planar longitudinal surfaces. The depth 29 of the longitudinal groove depends on such conditions as the size of the shaft diameter, the number of edges or apices, the material from which the shaft is made and the torque to be transmitted by the shaft.

By replacing the conventional rivets in stator stacks and the ribbed shafts in rotors by drawn rods having a polygonal cross section according to the invention, a greatly simplified and at the same time improved method of manufacturing such fastening means becomes possible.

Furthermore, the material from which the individual rivets or shafts can be made can be stored more easily since it is only necessary to have rods of the various desired diameters in store, regardless of the desired lengths, since rivets and shafts of a determined length can be easily cut from the rods in store.

Another advantage is obtained when phosphatizing, e.g. bonderizing the rods to be used for rivets or shafts, firstly in mechanical respect since such treatment facilitates the step of pressing the rods into the stacks due to improved sliding translational properties, secondly, due to the suppression of eddy currents due to the high electric resistivity of the phosphate or bonder layer 30.

It will be understood that this invention is susceptible to modification in order to adapt it to different usages and conditions, and, accordingly, it is desired to comprehend such modifications within this invention as may fall within the scope of the appended claims.

What we claim is:

1. A laminated stack assembly for use in an electric machine and the like apparatus, comprising a plurality of laminations forming the stack and having at least one circular bore extending in a direction perpendicular to said laminations, and a metallic fastening and mounting means consisting of a rod having a regular polygonal cross section in said bore, the diameter of the circle inscribed in said polygonal cross section being maximally equal to, and the diameter of the circle circumscribing said polygonal cross section being larger than, the diameter of said circular bore so that the longitudinal corner portions of said rod penetrate into the inner wall surface of said bore.

2. A laminated stack assembly for use in an electric machine and the like apparatus, comprising a plurality of laminations forming the stack and having at least one circular bore extending in a direction perpendicular to said laminations, and a fastening and mounting means consisting of a metallic rod having a substantially hypocycloidal cross section in said bore, the diameter of the circle inscribed in said substantially hypocycloidal cross section being maximally equal to, and the diameter of the circle circumscribing said substantially hypocycloidal cross section being larger than, the diameter of said circular bore so that the longitudinal apex portions of said rod penetrate into the inner wall surface of said bore.

3. A laminated stack assembly for use in an electric machine and the like apparatus, comprising a plurality of laminations forming the laminated stack, said stack having at least one circular bore extending in a direction perpendicular to said laminations, and means for assembling and mounting said laminations together in said stack, said means comprising metallic rod means being of polygonal cross section, said rod means thus having a plurality of longitudinal edges, said rod means being in said bore, the diameter of said bore being less than the diameter of a circle circumscribed about said polygonal rod so that said longitudinal edges penetrate into the inner wall surface of said bore a distance equal to one-half the difference in diameters between said circle and said bore.

4. A laminated stack assembly as described in claim 3 wherein said rod means further comprises means in the form of a bonderized layer extending over the surface of said rod means, for increasing the translational capacity and the electric transitional resistivity of the rod means.

References Cited in the file of this patent
UNITED STATES PATENTS

| | | |
|---|---|---|
| 1,157,660 | Bennett | Oct. 26, 1915 |
| 1,783,050 | Morrill | Apr. 25, 1930 |
| 1,997,550 | O'Leary | Apr. 9, 1935 |
| 2,245,170 | Von Ende et al. | June 10, 1941 |
| 2,506,637 | Fog | May 9, 1950 |
| 2,763,059 | Caton et al. | Sept. 18, 1956 |